US007027511B2

United States Patent
Wang et al.

(10) Patent No.: US 7,027,511 B2
(45) Date of Patent: Apr. 11, 2006

(54) FAST MOTION ESTIMATION USING N-QUEEN PIXEL DECIMATION

(75) Inventors: Chung-Neng Wang, Kaohsiung (TW); Shin-Wei Yang, Taoyuan (TW); Chi-Min Liu, Hsinchu (TW); Tihao Chiang, Taipei (TW)

(73) Assignee: National Chiao Tung University, Hsinchu (TW)

( * ) Notice: Subject to any disclaimer, the term of this patent is extended or adjusted under 35 U.S.C. 154(b) by 402 days.

(21) Appl. No.: 10/118,370

(22) Filed: Apr. 9, 2002

(65) Prior Publication Data

US 2003/0123550 A1 Jul. 3, 2003

(30) Foreign Application Priority Data

Dec. 31, 2001 (TW) .............................. 90133168 A

(51) Int. Cl.
*H04B 1/66* (2006.01)

(52) U.S. Cl. .......................... 375/240.16; 375/240.17; 375/240.21; 375/240.24; 375/240.12; 382/238; 382/235; 382/236; 382/243; 348/699

(58) Field of Classification Search ........... 375/240.16, 375/240.17, 240.21, 240.23, 240.24, 240.12; 709/247; 348/699, 416; 382/236, 232, 246, 382/235, 243, 238
See application file for complete search history.

(56) References Cited

U.S. PATENT DOCUMENTS

| | | | |
|---|---|---|---|
| 5,737,537 A * | 4/1998 | Gardos et al. | 709/247 |
| 6,363,117 B1 * | 3/2002 | Kok | 375/240.24 |
| 6,567,469 B1 * | 5/2003 | Rackett | 375/240.16 |
| 6,687,301 B1 * | 2/2004 | Moschetti | 375/240.16 |
| 6,697,427 B1 * | 2/2004 | Kurak, Jr. et al. | 375/240.03 |

* cited by examiner

Primary Examiner—Shawn S. An
(74) Attorney, Agent, or Firm—Rosenberg, Klein & Lee

(57) ABSTRACT

The present invention proposes a fast motion estimation using N-queen pixel decimation, whereby after a reference block and a block to be processed are selected in a video sequence, an N×N queens pattern is used for pixel decimation to perform block match, thereby obtaining a good enough block difference value. The present invention combines pixel decimation with fast motion estimation for search points reduction to achieve the object of simplifying computational complexity of motion estimation. Therefore, the present invention can sieve out sufficiently representative pixels and will not increase extra computational complexity.

12 Claims, 5 Drawing Sheets

(a)

(b)

(c)

(d)

| Sequence | Format | BR | Fps | SA | Methods | PSNRY | PSNRU | PSNRV | ΔPSNRY | ChkPt | Pixels | Ratio |
|---|---|---|---|---|---|---|---|---|---|---|---|---|
| Container | QCIF | 10 | 7.5 | 16 | Full Search | 29.75 | 37.38 | 36.37 |  | 7501824 | 256 | 1 |
|  |  |  |  |  | Full Q | 29.60 | 37.22 | 36.36 | -0.15 | 7501824 | 64 | 4 |
|  |  |  |  |  | Full 4 | 29.74 | 37.34 | 36.40 | -0.01 | 7501824 | 64 | 4 |
|  |  |  |  |  | Full 8 | 29.31 | 37.19 | 36.08 | -0.44 | 7501824 | 32 | 8 |
|  |  |  |  |  | MVFAST_F | 29.78 | 37.49 | 36.57 | 0.03 | 33436 | 256 | 224.36 |
|  |  |  |  |  | MVFAST_Q | 29.71 | 37.62 | 36.63 | -0.04 | 35229 | 64 | 851.78 |
|  |  |  |  |  | MVFAST_4 | 29.70 | 37.52 | 36.62 | -0.05 | 33336 | 64 | 900.14 |
|  |  |  |  |  | MVFAST_8 | 29.72 | 37.43 | 36.58 | -0.03 | 34705 | 32 | 1729.28 |
|  |  |  |  |  | PMVFAST_F | 29.71 | 37.39 | 36.57 | -0.04 | 24726 | 256 | 303.40 |
|  |  |  |  |  | PMVFAST_Q | 29.77 | 37.50 | 36.50 | 0.02 | 24682 | 64 | 1215.76 |
|  |  |  |  |  | PMVFAST_4 | 29.77 | 37.63 | 36.52 | 0.02 | 23782 | 64 | 1261.77 |
|  |  |  |  |  | PMVFAST_8 | 29.73 | 37.56 | 36.57 | -0.02 | 23884 | 32 | 2521.75 |
| Foreman | CIF | 112 | 10 | 16 | Full Search | 30.05 | 36.73 | 37.49 |  | 40144896 | 256 | 1 |
|  |  |  |  |  | Full Q | 29.51 | 36.47 | 37.30 | -0.54 | 40144896 | 64 | 4 |
|  |  |  |  |  | Full 4 | 29.79 | 36.70 | 37.49 | -0.26 | 40144896 | 64 | 4 |
|  |  |  |  |  | Full 8 | 29.33 | 36.43 | 37.06 | -0.72 | 40144896 | 32 | 8 |
|  |  |  |  |  | MVFAST_F | 29.89 | 36.88 | 37.66 | -0.16 | 473299 | 256 | 84.82 |
|  |  |  |  |  | MVFAST_Q | 29.61 | 36.80 | 37.72 | -0.44 | 446359 | 64 | 359.75 |
|  |  |  |  |  | MVFAST_4 | 29.83 | 36.82 | 37.73 | -0.22 | 453247 | 64 | 354.29 |
|  |  |  |  |  | MVFAST_8 | 29.60 | 36.80 | 37.66 | -0.45 | 444744 | 32 | 722.12 |
|  |  |  |  |  | MVFAST_4R | 29.06 | 36.56 | 37.41 | -0.99 | 447622 | 16 | 1434.96 |
|  |  |  |  |  | PMVFAST_F | 29.97 | 36.94 | 37.76 | -0.08 | 378736 | 256 | 105.99 |
|  |  |  |  |  | PMVFAST_Q | 29.66 | 36.83 | 37.71 | -0.39 | 364766 | 64 | 440.22 |
|  |  |  |  |  | PMVFAST_4 | 29.88 | 36.91 | 37.82 | -0.17 | 366304 | 64 | 438.38 |
|  |  |  |  |  | PMVFAST_8 | 29.65 | 36.71 | 37.65 | -0.40 | 364337 | 32 | 881.49 |
|  |  |  |  |  | PMVFAST_4R | 29.10 | 36.54 | 37.35 | -0.85 | 374118 | 16 | 1716.89 |
| Stefan | CCIR 601 | 1M | 10 | 16 | Full Search | 26.43 | 32.60 | 32.87 |  | 136857600 | 256 | 1 |
|  |  |  |  |  | MVFAST_F | 26.58 | 33.07 | 33.38 | 0.15 | 1584656 | 256 | 86.36 |
|  |  |  |  |  | MVFAST_Q | 26.38 | 32.87 | 33.18 | -0.05 | 1376083 | 64 | 397.82 |
|  |  |  |  |  | MVFAST_4 | 26.55 | 33.05 | 33.39 | 0.12 | 1397127 | 64 | 391.83 |
|  |  |  |  |  | MVFAST_8 | 26.47 | 32.99 | 33.30 | 0.04 | 1365344 | 32 | 801.89 |
|  |  |  |  |  | MVFAST_4R | 26.24 | 32.76 | 33.02 | -0.19 | 1385464 | 16 | 1580.50 |
|  |  |  |  |  | MVFAST_F | 26.57 | 33.03 | 33.37 | 0.14 | 1414828 | 256 | 96.73 |
|  |  |  |  |  | MVFAST_Q | 26.35 | 32.84 | 33.13 | -0.08 | 1222771 | 64 | 447.69 |
|  |  |  |  |  | PMVFAST_4 | 26.54 | 33.04 | 33.36 | 0.11 | 1251042 | 64 | 437.58 |
|  |  |  |  |  | PMVFAST_8 | 26.46 | 32.98 | 33.28 | 0.03 | 1227809 | 32 | 891.72 |
|  |  |  |  |  | PMVFAST_4R | 26.23 | 32.73 | 33.00 | -0.20 | 1244059 | 16 | 1760.14 |
| Stefan | CCIR 601 | 1M | 10 | 32 | Full Search | 27.11 | 33.05 | 33.43 |  | 547430400 | 256 | 1 |
|  |  |  |  |  | MVFAST_F | 27.13 | 33.47 | 33.92 | +0.02 | 1603677 | 256 | 341.36 |
|  |  |  |  |  | MVFAST_Q | 26.72 | 33.15 | 33.51 | -0.39 | 1375883 | 64 | 1591.50 |
|  |  |  |  |  | MVFAST_4 | 26.98 | 33.43 | 33.85 | -0.03 | 1398414 | 64 | 1568.86 |
|  |  |  |  |  | MVFAST_8 | 26.77 | 33.25 | 33.62 | -0.34 | 1369241 | 32 | 3198.45 |
|  |  |  |  |  | MVFAST_4R | 26.44 | 32.93 | 33.24 | -0.67 | 1386207 | 16 | 6318.60 |
|  |  |  |  |  | PMVFAST_F | 27.17 | 33.50 | 33.94 | +0.06 | 1425441 | 256 | 384.04 |
|  |  |  |  |  | PMVFAST_Q | 26.75 | 33.16 | 33.52 | -0.36 | 1226344 | 64 | 1785.57 |
|  |  |  |  |  | PMVFAST_4 | 27.13 | 33.48 | 33.93 | +0.02 | 1253491 | 64 | 1746.90 |
|  |  |  |  |  | PMVFAST_8 | 27.02 | 33.41 | 33.85 | -0.09 | 1221419 | 32 | 3585.54 |
|  |  |  |  |  | PMVFAST_4R | 26.73 | 33.17 | 33.53 | -0.38 | 1237161 | 16 | 7079.83 |

Fig.5

FAST MOTION ESTIMATION USING N-QUEEN PIXEL DECIMATION

FIELD OF THE INVENTION

The present invention relates to a motion estimation and, more particularly, to a fast motion estimation using N-queen pixel decimation to remove redundancy in video sequence so as to achieve the object of video compression.

BACKGROUND OF THE INVENTION

Along with progress of scientific technology, the flow and quality of video data in transmission of video sequence become more and more important. A video sequence is composed of a series of images in a continuous time. Because the required storage space of a video sequence is very large, for a limited storage equipment or transmission bandwidth, it is expected that the required storage space of the video sequence can be reduced. The video sequence thus needs to be compressed. Therefore, the video compression technique is required. Video compression usually makes use of removing redundancy in video data to achieve the object of compression. Motion estimation is a compression technique used to remove temporal redundancy on the time axis.

The motion estimation describes how to find the most approximate block with the present processed one on two adjacent frames of time axis in a video sequence. The motion estimation generally makes use of search points reduction and pixel decimation to reduce computational complexity. Methods of search points reduction include famous fast algorithms like three steps search (TSS) algorithm, 2D log search algorithm, new three points search algorithm (NTSS algorithm), diamond search algorithm, and motion vector field adaptive search technology (MV_FAST algorithm), and predictive motion vector field adaptive search technology (PMV_FAST algorithm).

For adjacent pixels on the same frame, the brightness thereof ought to be very similar. Therefore, for pixels in a block, it is not necessary for every pixel to undergo computational criterion of difference value. This is because some pixels in a block may be noise so that if they are taken into account when calculating difference value between blocks, decision of motion estimation will be affected. For a uniform block, there will usually little difference for the brightness values between adjacent pixels usually. Therefore, when calculating difference value between blocks, it is not necessary for every pixel to undergo computational criterion of difference value. It is only necessary to pick some pixels sufficiently to represent the block for comparison.

Computational complexity for comparison of blocks can be reduced if the really representative pixels can be found. Therefore, a pixel decimation using similarity between pixels to reduce computational complexity of motion estimation is thus provided. For motion estimation in video compression, the pixel decimation can be generally divided into regular pixel decimation and adaptive pixel decimation. These two methods have their respective advantages and disadvantages. The regular pixel decimation (e.g., ¼ pixel decimation) makes use of fixed samples to reduce sampling rate. The embodiment is thus very simple and quick. It is not necessary to calculate which pixels are more representative for calculation of block difference value. However, the positions of selected pixels by reducing the sampling rate are fixed. When the brightness values in a block vary abruptly, the pixels selected by the regular pixel decimation may be not sufficiently representative for adjacent pixels, resulting in loss of important information and thus causing errors in decision of motion estimation.

The advantage of adaptive pixel decimation is that the samples for reducing sampling rate are variable. The adaptive pixel decimation will dynamically select which pixels for representing the whole block to perform calculation of block difference value according to variation of brightness values in the block. Accordingly, when the brightness values vary abruptly, motion estimation will select more pixels to keep sufficiently representative. When the brightness values vary little, motion estimation only selects less pixels to have sufficient representation for calculation of block difference value. Although this way of pixel decimation can avoid the disadvantage that every pixel in a block undergoes the criterion of difference value calculation, redundant time will be wasted in determining which pixels are sufficiently representative, hence increasing extra computational complexity and thus increasing some computational burden of motion estimation.

The present invention aims to propose a new pixel decimation method, which can sieve out sufficiently representative pixels and will not increase extra computational complexity, hence effectively resolving the above disadvantages.

SUMMARY OF THE INVENTION

The primary object of the present invention is to propose a fast motion estimation using N-queen pixel decimation, which makes use of N-queen pixel decimation to lower sampling rate for reducing computational complexity of motion estimation. Moreover, the fast motion estimation can sieve out sufficiently representative pixels and will not increase extra computational complexity.

Another object of the present invention is to propose a fast motion estimation using N-queen pixel decimation, which maintains visual quality and lowers bit rate at the same time of reducing computational complexity.

To achieve the above objects, the present invention first selects a reference block and a block to be processed in a video sequence. Each block is composed of N×N pixels. N is larger than or equal to 4. Next, an N×N queens pattern is used so that only one pixel is selected in each row, column, and diagonal of the two blocks. There are totally N pixels selected in each of the two blocks. Subsequently, block match is performed to obtain a block difference value. If the block difference value is good enough, motion estimation is done; otherwise, the next set of blocks is continually selected, the queens the pattern is made use of, and block match is performed until a good enough block difference value is obtained.

The various objects and advantages of the present invention will be more readily understood from the following detailed description when read in conjunction with the appended drawings, in which:

BRIEF DESCRIPTION OF THE DRAWINGS

FIG. 5 is a diagram showing experimental results under different test conditions.

DETAILED DESCRIPTION OF THE PREFERRED EMBODIMENTS

The present invention combines pixel decimation with fast motion estimation of search points reduction to achieve the object of simplifying computational complexity of motion estimation. Therefore, the present invention can sieve out sufficiently representative pixels and will not increase extra computational complexity.

Figure 1:
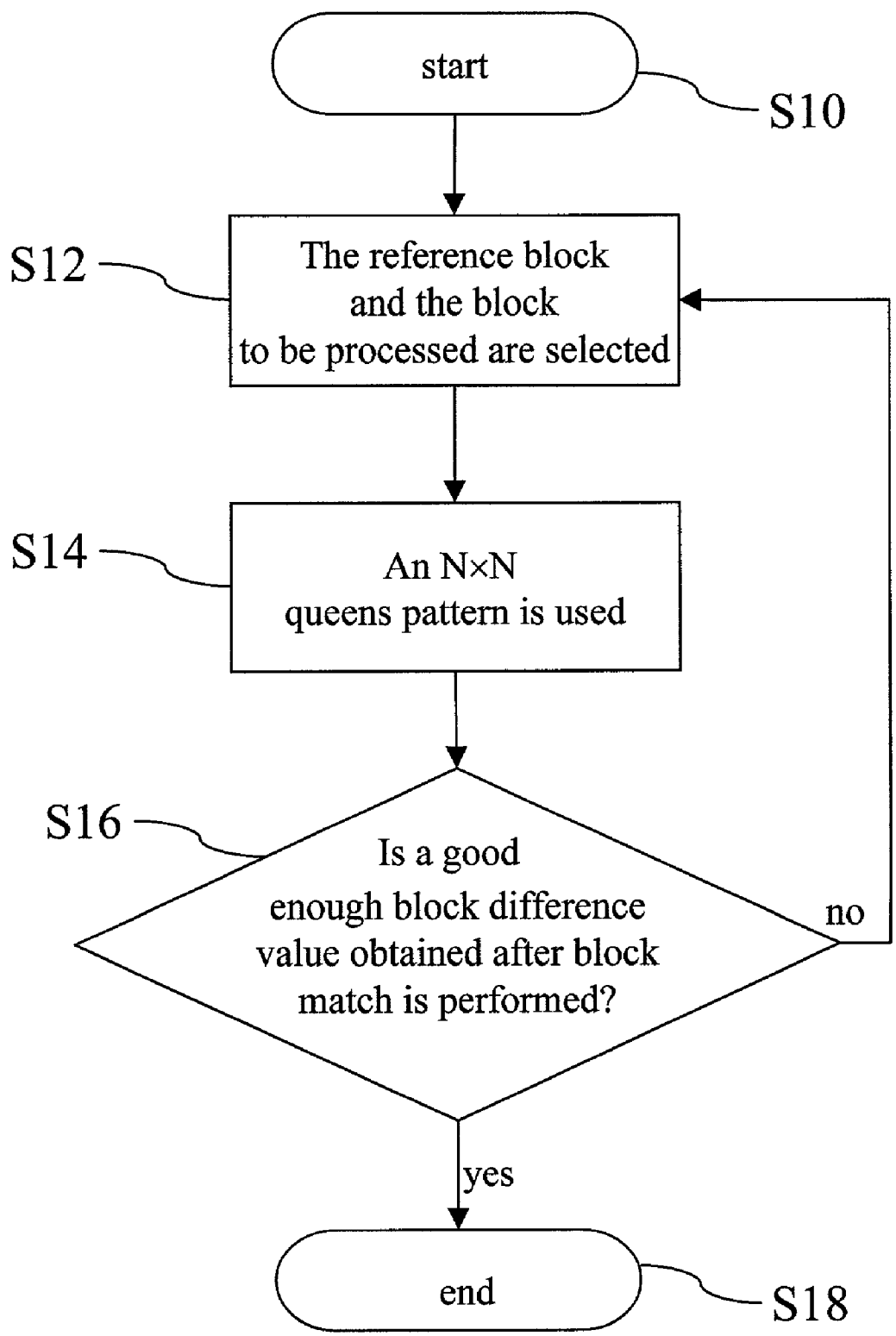
FIG. 1 is a flowchart diagram of a fast motion estimation of the present invention.

As shown in FIG. 1, the fast motion estimation using N-queen pixel decimation comprises the following steps. First, the whole fast motion estimation is started in step S10. Next, a reference block and a block to be processed are selected in a video sequence (step S12). Each block is composed of N×N pixels. N is larger than or equal to 4. The reference block and the block to be processed are selected among frames, sub-blocks of frames, and pixel layers.

Important edge information or line information in a block may appear at any direction, column, row, or diagonal in the block. In order to avoid losing information at these possible directions, it is necessary to select representative pixels at any direction in the block. Therefore, in the present invention, an N×N queens pattern is used after the step S12 (step S14). Only a pixel is selected from each column, row, and diagonal in the two blocks. There are totally N pixels selected.

After N pixels are selected from the reference block and the block to be processed, block match is immediately performed (step S16). A block difference is obtained between the block to be processed and the reference block by using difference calculation criterion. This result is the result obtained by calculating the selected pixels. If the block difference is good enough, the motion estimation is finished (step S18). If the block difference is not good enough, the step S12 is repetitively performed. The next reference block and block to be processed are selected, and queens pattern of the step S14 is repetitively performed. Block match is performed (step S16) to obtain another block difference. All the obtained block differences are compared to pick out an optimal block difference. If the optimal block difference is good enough (e.g., being smaller than a preset critical value or being a minimum), the motion estimation can be finished (step S18). Otherwise, the step S12 is repetitively performed until a good enough block difference conforming to the requirement is obtained.

Finally, after finishing the motion estimation, redundancy in the video sequence can be removed so that the encoder only needs to encode difference of frame. Because the pixels picked out by the present invention are representative, visual quality can be kept and bit rate can be reduced at the same time of reducing computational complexity.

The ways of calculating the block difference include mean square error (MSE), mean absolute difference (MAD), and sum of absolute difference (SAD). These calculation criteria of difference are made use of to determine similarity between blocks. The selected block is of fixed size or variable size. The block's shape can be square or non-square according to different setting of user.

Figure 2:
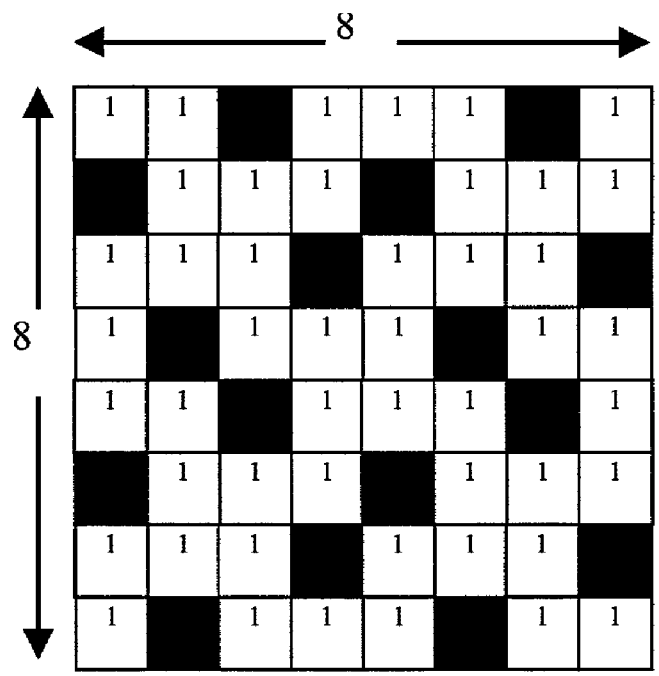
FIG. 2 is a diagram according to an embodiment of the present invention, wherein a 4×4 queens pattern is used.

For directional representation of pixel, the N-queens pattern has a certain representation for pixels at any direction in a block. For local representation of pixel, the N-queens pixel decimation is better than other methods of pixel decimation in the prior art. As shown in FIG. 2, in an 8×8 pixels, with the 4×4 queens pattern as an example, the distances between the selected pixels and adjacent pixels in the area are all 1. For local representation, the pixels selected by the 4×4 queens pattern have higher representation than those selected by other ways. The present invention uses the 44 queens pattern as a sub-block. A block having N×N pixels can thus be equally divided into N/4×N/4 sub-blocks, each being a 4×4 queens pattern. Because only four pixels will be simultaneously selected from each sub-block, the computational complexity will only be ¼ of the original full search algorithm. Similarly, the computational complexity of 8×8 queens pattern is only ⅛ of the original full search algorithm. Therefore, for N×N queens pattern, the computational complexity of the present invention is only 1/N of the original algorithm, hence increasing the calculation speed for N times.

However, the way of solving N-queens problem is not unique. For instance, there are 92 different patters for 8-queens pattern in an 8×8 block. For these 92 different samples for reducing sampling rates, one can calculate the average distance between selected pixels and non-selected pixels in each pattern, i.e., local representation of pixel. According to the calculation result, the average distances of these 92 sets of patterns distribute from 1.29 to 1.37 pixels. The difference of average distance of these 92 sets of patterns is only 0.08 pixels, resulting in a difference not larger than 0.1 dB in PSNR. Therefore, no matter which sampling pattern is selected, motion estimation (coding efficiency) will be little affected.

Figure 3:
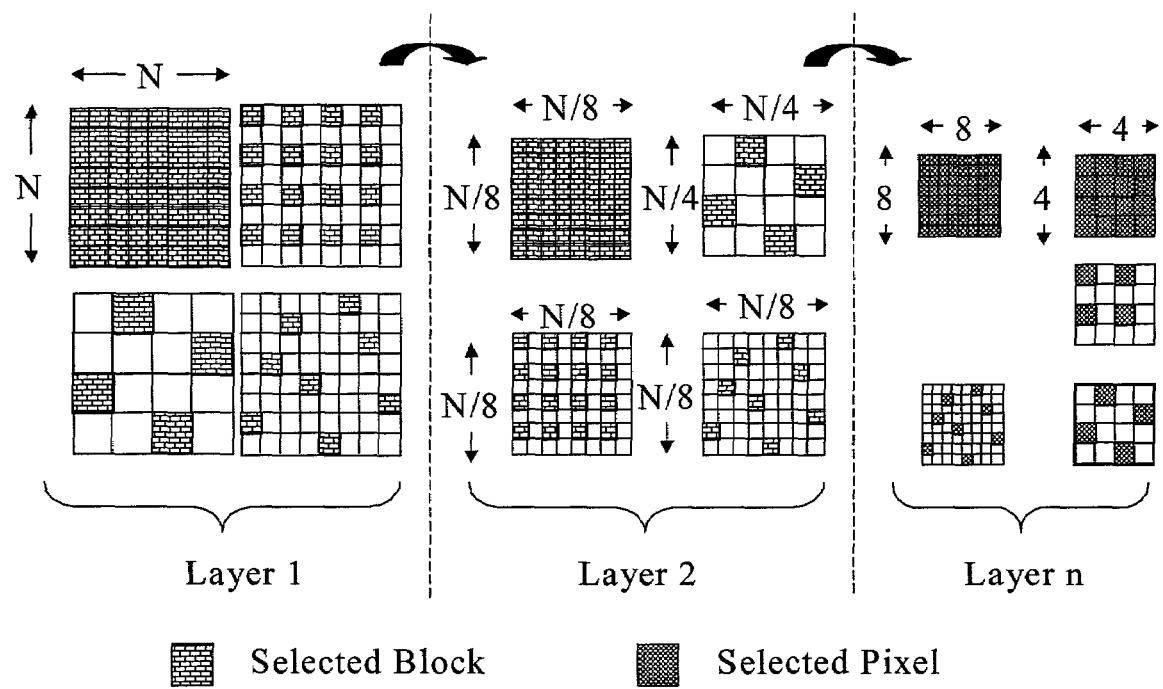
FIG. 3 is a diagram of the present invention, wherein an N×N queens pattern is divided into several layers for orderly sampling.

The present invention can further divide the N×N queens pattern into several layers for performing the action of reducing sampling rate. Each layer is composed of n blocks of the same size of N/n×N/n pixels. As shown in FIG. 3, at the first layer, if each sub-block is viewed as a pixel, the action of reducing sampling rate of the first time can be performed to the whole block. That is, the sub-block to be processed for calculation of block difference is selected. At the second layer, each sub-block can be viewed as a complete block so that the action of reducing sampling rate can be performed to each sub-block. Moreover, when performing pixel decimation according to the layer, different sampling patterns can be selected. In order to achieve the effect of the present invention, it is only necessary for the sampling pattern of at least a layer to be the queens pattern.

The above principle and effect will be exemplified below.

In order to analyze the performance of motion estimation, the present invention uses the latest video compression standard: MPEG4 reference software as the experiment simulation software, and makes use of mean absolute difference (MAD) for calculation of block difference. In experiment, the three parameters of sampling patterns, search strategies, and test conditions are used to analyze coding efficiency of different methods.

Figure 4:
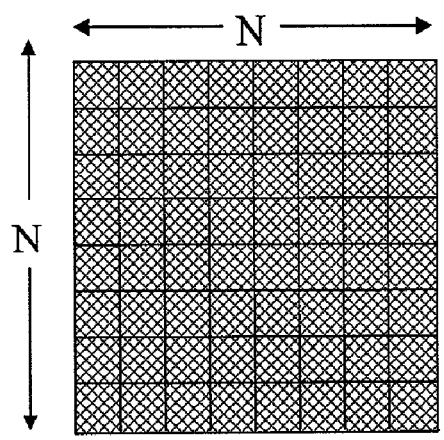
FIG. 4 shows four kinds of sampling patterns in experiments of the present invention; (a) full sampling pattern, (b) ¼ sampling pattern, (c) 4 queens pattern, and (d) 8 queens pattern.
Figure 4:
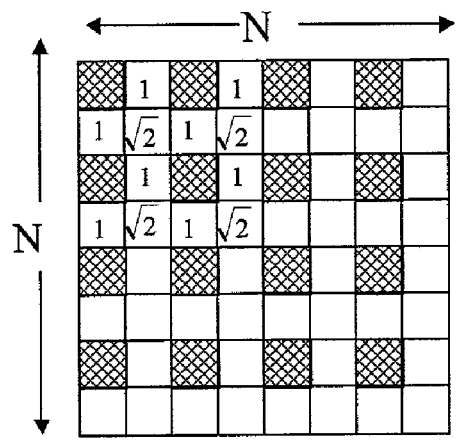
Figure 4:
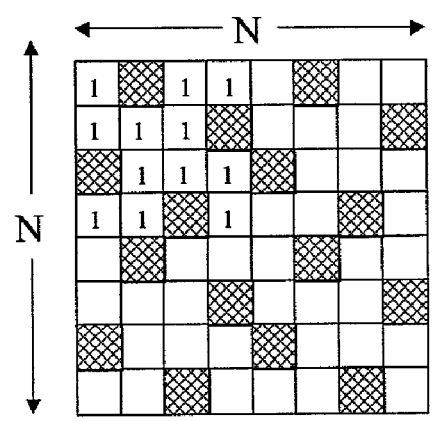
Figure 4:
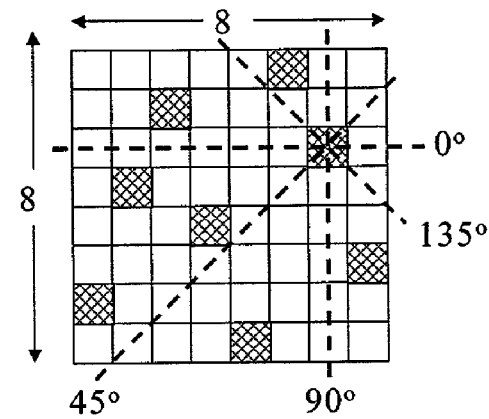

For sampling patterns, the present invention uses the four sampling patterns shown in FIG. 4. The four sampling patterns are full pattern (labeled as F), quarter sampling pattern (labeled as Q), 4-queens pattern (labeled as 4), and 8-queens pattern (labeled as 8). Besides, two-layers recursive scheme (labeled as 4R) makes use of the same 4-queens pattern at the block layer and the pixel layer.

For search strategies, the present invention adopts the full search algorithm and other two algorithms adopted by the MPEG4 committee: MV_FAST and PMV_FAST. In experiment, pixel decimation is combined with various kinds of fast search algorithms.

The whole experimental result is shown in FIG. 5. In the table of experimental result, the 'Full' field means full search algorithm, the 'MV'' field means MV_FAST approach, and the 'PMV' field means PMV_FAST approach. In the method field, the first symbol of fast algorithm means the search strategy, and the second symbol thereof means the sampling sample. For instance, PMV_8 means that the search strategy is PMV_FAST approach, and the sampling sample is 8-queens pixel pattern. The 'Format' field means the storage format of video sequence. The 'BR' (bit rate) field uses kbps (kbits per second) as the unit. The 'FPS' (frames per second) field means frame rate. The 'SA' field means search area. The 'PSNRY' field means PSNR (peak signal noise ratio) of luminance. The 'ChkPts' field means the number of search points really compared with the block to be processed in motion estimation. The 'Pixels' field means the number of pixels selected for calculation of block difference in a block in motion estimation. The final 'Ratio' field means the factor of improvement when the computational complexity of the fast algorithm of the field is compared with that of the full search algorithm.

As shown in FIG. 5, these experimental results under different test conditions show that, for video sequence of frames of little variation, the video compression quality of 4-queens pattern is slightly better than that of quarter sampling pattern, and the video compression quality of quarter sampling pattern is slightly better than that of 8-queens pattern. For video sequence pf frames of abrupt variation, the video compression quality of 4-queens pattern is much better than that of quarter sampling pattern, and 8-queens pattern can achieve the video compression quality approximate to that of quarter sampling pattern by only using a half of the number of pixels selected by quarter sampling pattern. When the frame size of video sequence becomes larger, the block becomes relatively smaller. At this time, pixels selected by N-queens pattern have higher representation so that the video compression quality of N-queens pattern will be higher that those of other pixel sampling patterns. For different sizes of search area, the video compression quality of N-queens pattern will not be affected. When N-queens pattern is combined with other different search approaches, the video compression quality of 4-queens pattern is approximate to that of the original search approach with an error of about 0.1 dB. The video compression quality of 8-queens pattern has an error of about 0.2~0.3 dB because only a half of the number of pixels of 4-queens pattern are selected. For different bit rates, the video compression quality of N-queens pattern will not be affected. Therefore, N-queens pattern has little influence to video compression quality and bit rate under these test conditions.

According to the experimental results and the above analysis, N-queens pattern proposed by the present invention has the compression performance approximate to that of the original approach under different test conditions of video sequence, sampling pattern, search strategy, search area, and bit rate. Moreover, less quantity of computation is achieved by adopting N-queens pixel decimation, and a better video compression quality can be obtained under the same bit rate.

To sum up, the present invention has many advantages. First, because the N-queens pattern is a regular pixel decimation pattern, the advantage of easy embodiment is achieved, and this method can effectively reduce the computational complexity of the original full search algorithm to 1/N. Second, the principle of N-queens pattern can be very simply combined with other fast algorithms to further reduce the computational complexity. Third, the video compression quality is hardly affected after N-queens pattern is combined with other search strategies. This is because that the pixels selected by N-queens pattern have higher local representation and directional representation at any direction in a block.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A fast motion estimation of a video sequence using N-queens pixel decimation, comprising the steps of:
   (a) selecting a reference block and a block to be processed in a video sequence, each said block being composed of N×N pixels, where N is a number larger than or equal to 4;
   (b) selecting in each said block N pixels in accordance with an N×N queens pattern, said N pixels of said N×N queens pattern simultaneously fulfilling all of the conditions of:
      (i) none of said N pixels occupies a position in said block along the same row as any other one of said N pixels;
      (ii) none of said N pixels occupies a position in said block along the same column as any other one of said N pixels; and,
      (iii) none of said N pixels occupies a position in said block along the same diagonal as any other one of said N pixels;
   (c) calculating a block difference value to determine if said reference block matches said block to be processed and determining motion estimation parameters from said matching blocks if said block difference value matches a predetermined criterion, proceeding to step (d) otherwise;
   (d) selecting a next reference block and block to be processed and repeating the method at step (b) until said block difference value matches said predetermined criterion; and
   (e) determining said motion estimation parameters from said matching blocks.

2. The fast motion estimation as claimed in claim 1, wherein said block is selected from the group consisting of frames, sub-blocks of frames, and pixel layers.

3. The fast motion estimation as claimed in claim 1, wherein said N×N queens pattern in said step (b) is divided into layers, each layer being composed of n blocks of the same size of N/n×N/n.

4. The fast motion estimation as claimed in claim 3, wherein a different sampling pattern is selected when performing pixel decimation according to said layer, and the sampling pattern of at least a layer is a queens pattern.

5. The fast motion estimation as claimed in claim 1, wherein only the selected pixels are used to calculate the difference value between said blocks in said steps (c) and (d).

6. The fast motion estimation as claimed in claim 1, wherein said block difference value is calculated as one of the group consisting of mean square error, mean absolute difference, and sum of absolute difference.

7. The fast motion estimation as claimed in claim 1, wherein said block is of fixed size.

8. The fast motion estimation as claimed in claim 1, wherein said block is of variable size.

9. The fast motion estimation as claimed in claim 1, wherein said block is a square block.

10. The fast motion estimation as claimed in claim 1, wherein said block is a non-square block.

11. The fast motion estimation as claimed in claim 1, wherein said motion estimation parameter is a motion vector of said block to be processed of said matching blocks.

12. The fast motion estimation as claimed in claim 1, wherein redundant pixels in the video sequence are removed after determining said motion estimation parameters.

* * * * *